Sept. 30, 1969  S. DUMARTIN ET AL  3,469,920
MEANS FOR OBTAINING THE INVERTED RAMAN SPECTRUM
OF A SUBSTANCE TO BE STUDIED
Filed July 25, 1966

INVENTOR
S. DUMARTIN
BY
William D. Stokes
ATTORNEY

3,469,920
MEANS FOR OBTAINING THE INVERTED RAMAN SPECTRUM OF A SUBSTANCE TO BE STUDIED
Serge Dumartin and Boris Oksengorn, Paris, France, Marvin Tobin, Norwalk, Conn., and Boris Vodar, Issy-les-Moulineaux, France, assignors of thirty-three percent to Centre National de la Recherche Scientifique, Paris, France, and sixty-seven percent to Perkin-Elmer Co., Norwalk, Conn., a society of Connecticut
Filed July 25, 1966, Ser. No. 567,720
Claims priority, application France, July 27, 1965, 26,195
Int. Cl. G01j 3/44
U.S. Cl. 356—75                     12 Claims

ABSTRACT OF THE DISCLOSURE

A coherent monochromatic beam of very high intensity (e.g., ten megawatts) is focused into a compressed gas (such as krypton or xenon) to produce a wide, continuous spectrum, substantially synchronized with the monochromatic beam. The energy of the monochromatic beam is reduced to below the threshold required to produce stimulated Raman emission in the sample to be studied, and the resulting beam containing the continuous and monochromatic light is focused into the sample to produce the inverted Raman spectrum in it. The emergent beam containing the inverted Raman spectrum is projected into a spectrograph.

---

Figure 1:
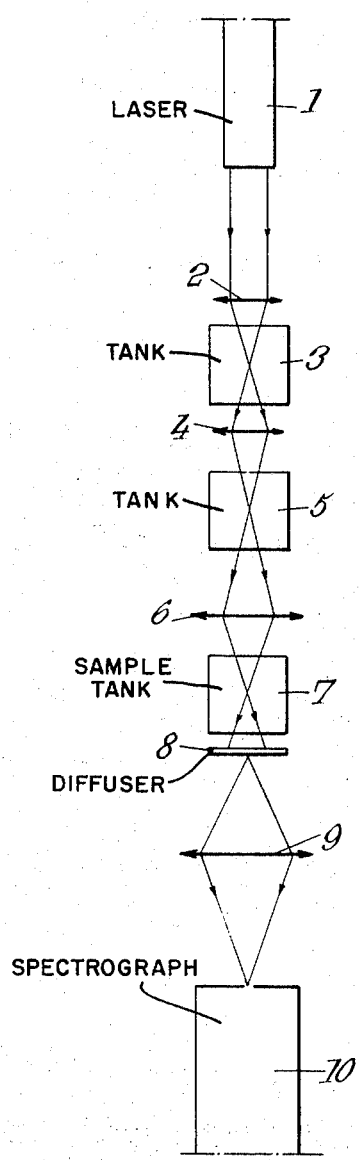

This invention relates to a method and apparatus for obtaining the inverted Raman spectrum of a substance to be studied, so as to enable a study to be made of the molecular structure of the substance.

It should be noted that the ordinary Raman spectrum (non-coherent diffused light) and the stimulated Raman spectrum (coherent diffused light obtained with lasers) are observed only on emission, the so-called "inverted Raman spectrum" being the reverse process to the stimulated emission noted on absorption. The inverted Raman spectrum occurs only when an intense continuous spectrum and a monochromatic line of very high intensity exist simultaneously in the medium under study.

The present invention has for its principal object to provide improved means of obtaining the inverted Raman spectrum of a substance to be studied, and accordingly consists in producing a monochromatic beam of very high intensity by means of a triggered laser preferably having an intensity of the order of ten megawatts or more in focusing this beam once or several times in a tank or in a plurality of tanks arranged in series and containing a gas compressed to above atmospheric pressure, whereby to cause this gas to emit an intense continuous spectrum extending from the infrared to the ultraviolet and virtually synchronized with the laser beam, in reducing the energy of the laser beam below the threshold which causes the emission of a stimulated Raman spectrum in the substance to be studied, while at the same time holding the energy level close to this threshold, said energy reduction being possibly obtained by mere passage of the laser beam through one or more of said tanks, in focusing the resulting composite beam once or several times within the substance to be studied and in projecting the emergent beam containing the inverted Raman spectrum on the inlet slit of a spectrograph.

The description which follows with reference to the accompanying non-limitative exemplary drawing will give a clear understanding of how the invention can be carried into practice.

Figure 2:
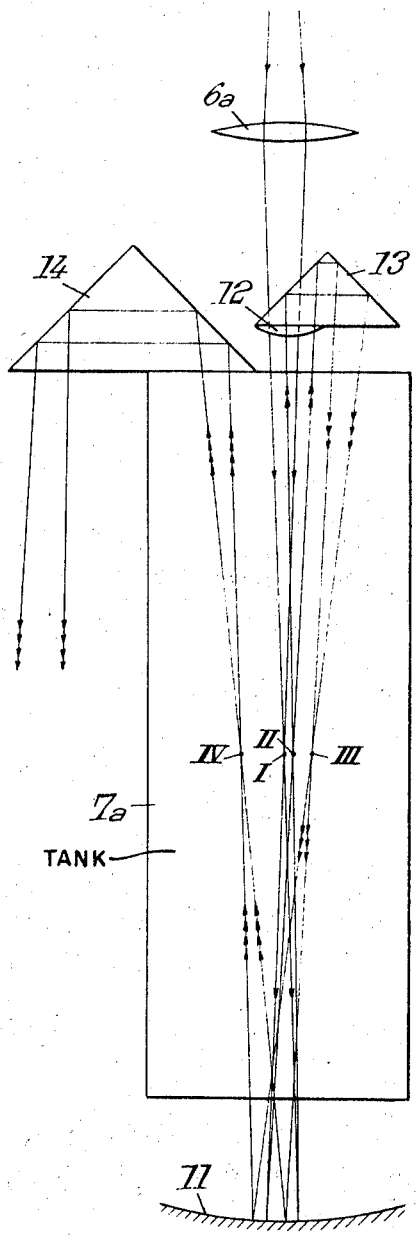

In the drawing:

FIG. 1 schematically illustrates one possible form of embodiment of apparatus for performing the invention; and FIG. 2 schematically illustrates the tank containing the substance to be studied and a form of embodiment of the optical system for providing the necessary focusings in said tank, which tank and optical system form part of the apparatus for carrying the present invention into practice.

In the preferred form of embodiment of the subject means of this invention for obtaining the inverted Raman spectrum of a substance to be studied, recourse is had to a triggered ruby laser 1 of a power of about ten megawatts which emits a beam of very intense monochromatic coherent light on to a convergent lens 2 which focuses the beam inside a tank 3 containing a pure monoatom or polyatom gas or a gas mixture compressed to above atmospheric pressure. Both the nature and the pressure (which in some cases may attain several hundred atmospheres) of the gas are so chosen that, responsively to the laser beam impinging on it, the gas emit a continuous spectrum of high intensity, particularly in the spectrum region close to the laser line. One gas that has proved particularly suitable for producing such a continuous spectrum is krypton at a pressure of ten atmospheres; alternatively, xenon may be used. There is thereby obtained on exit from tank 3 an intense continuous spectrum accompanied by the attenuated laser line. In cases where the laser line is not sufficiently attenuated so as not to produce a stimulated Raman effect (on emission) in the substance to be studied, a convergent lens 4 is used to obtain a second focusing in a tank 5 preferably containing the same gas as tank 3, under similar conditions. The duration of the composite flash (continuous spectrum and correctly attenuated laser beam) does not exceed a hundred nanoseconds or so, despite the fact that the continuous spectrum alone has a longer decay time that affects only a small proportion of its total intensity. The continuous spectrum and the laser line are furthermore synchronized for all practical purposes. The composite light beam is focused by a convergent lens 6 into a tank 7 containing the substance to be studied, which tank may be five centimetres long for example. Positioned at the exit end of tank 7 is a diffuser 8 the image of which is formed by means of a convergent lens 9 on the inlet slit of a spectrograph 10, whereby the inverted Raman spectrum of the substance to be studied can be observed.

In order to render the absorption lines more intense, recourse may be had not to a single focusing but to a plurality of focusings of the composite beam within the tank containing the substance to be studied, in which case an optical system is associated to said tank. Such apparatus is shown in FIG. 2 and permits four passages and focusings of the beam in tank 7a (the length of which may be fifty centimetres for example). Convergent lens 6a (which replaces lens 6 in FIG. 1) provides an initial focusing of the composite beam at point I in tank 7a. After an initial passage through the tank, the beam, the limit rays of which are shown by arrows, is reflected by a metal-coated concave mirror 11, passes through the tank a second time (the beam being identified by double arrows), is focused at point II, then passes through convergent lens 12 and total-reflection prism 13. The beam is returned into the tank for the third time (being identified by triple arrows in FIG. 2), focuses at the point III, is reflected by mirror 11 back into the tank for the fourth time (the beam being identified by quadruple arrows) and is focused at the point IV. Total-reflection prism 14 finally reflects the beam back into the tank for the last time, towards the spectrograph slit.

The applicants have had occasion to observe the inverted Raman spectrum of a number of liquid organic substances. In contrast to what happens on emission, this spectrum is more intense on the side corresponding to frequencies higher than the laser frequency, these frequencies being known as the Raman anti-Stokes frequencies. Furthermore, the applicants have brought to light a phenomenon not hitherto observed: with certain substances such as benzene and carbon disulphide in the liquid state, very heavy absorption occurs in the region of the frequencies below the laser frequencies, known as the Raman-Stokes frequencies, thereby revealing a new kind of Raman absorption process.

It goes without saying that many changes and substitutions of parts may be made to the specific form of embodiment hereinbefore described, without departing from the spirit and scope of the invention.

What is claimed is:

1. Method of obtaining the inverted Raman spectrum of a substance, comprising the steps of:
    producing a monochromatic laser beam of very high intensity,
    focusing the laser beam in gas compressed to above atmospheric pressure whereby to cause emission by said gas of an intense continuous spectrum extending from the infrared to the ultraviolet and substantially synchronized with the laser beam,
    reducing the energy of said laser beam below the threshold which causes a stimulated Raman spectrum to be emitted in the substance under study while at the same time keeping the energy level close to said threshold,
    focusing the resulting intense continuous spectrum emitted by said gas and said reduced laser beam into a composite beam at least once within the substance under study to produce an inverted Raman spectrum from the substance,
    and projecting the emergent beam containing the inverted Raman spectrum on to an inlet slit of a spectrograph.

2. Method according to claim 1, including maintaining said monochromatic laser beam at an intensity of at least about ten megawatts.

3. Method according to claim 2, wherein said step of reducing the energy of said laser beam is performed by passing said laser beam through said compressed gas.

4. Method according to claim 1, wherein said laser beam is focused into krypton gas for producing the intense continuous spectrum.

5. Method according to claim 4, wherein said krypton gas is compressed to a pressure of ten atmospheres.

6. Method according to claim 1, wherein said laser beam is focused into xenon gas for producing the intense continuous spectrum.

7. Apparatus for obtaining the inverted Raman spectrum of a substance, comprising:
    a triggered laser for producing a monochromatic beam of very high intensity,
    at least one tank containing gas compressed to above atmospheric pressure,
    means for focusing said beam at least once within said tank whereby to cause emission by said gas of an intense continuous spectrum extending from the infrared to the ultraviolet and substantially synchronized with the laser beam,
    means for reducing the energy of said laser beam below the threshold which causes a stimulated Raman spectrum to be emitted in the substance under study while at the same time keeping the energy level close to said threshold,
    means for focusing the resulting intense continuous spectrum emitted by said gas and said reduced laser beam into a composite beam at least once within the substance under study to produce an inverted Raman spectrum from said substrate,
    and means for projecting the emergent beam containing the inverted Raman spectrum on to an inlet slit of a spectrograph.

8. Apparatus according to claim 7, wherein said intensity is about ten megawatts.

9. Apparatus according to claim 8, wherein said means for reducing the energy of said laser beam comprise said at least one tank in which the energy of said laser beam is reduced during its passage therethrough.

10. Apparatus according to claim 7, wherein said gas is krypton for producing the intense continuous spectrum responsively to said laser beam impinging thereon.

11. Apparatus according to claim 10, wherein said krypton gas is at a pressure of ten atmospheres.

12. Apparatus according to claim 7, wherein said gas is xenon at a pressure for producing the intense continuous spectrum responsively to the laser beam impinging thereon.

References Cited

UNITED STATES PATENTS

| | | |
|---|---|---|
| 2,779,230 | 1/1957 | White. |
| 3,204,105 | 8/1965 | Robinson. |
| 3,371,265 | 2/1968 | Woodbury et al. ____ 331—94.5 |

RONALD L. WIBERT, Primary Examiner

F. L. EVANS, Assistant Examiner

U.S. Cl. X.R.

250—43.5, 83.3; 331—94.5; 356—246